(12) United States Patent
Cheng et al.

(10) Patent No.: US 8,902,375 B2
(45) Date of Patent: Dec. 2, 2014

(54) LCD DEVICE AND FIXING STRUCTURE THEREOF

(75) Inventors: Jia-He Cheng, Shenzhen (CN); Shih-Hsiang Chen, Shenzhen (CN)

(73) Assignee: Shenzhen China Star Optoelectronics Technology Co., Ltd., Shenzhen, Guangdong Province (CN)

(*) Notice: Subject to any disclaimer, the term of this patent is extended or adjusted under 35 U.S.C. 154(b) by 398 days.

(21) Appl. No.: 13/380,906

(22) PCT Filed: Dec. 12, 2011

(86) PCT No.: PCT/CN2011/083801
§ 371 (c)(1),
(2), (4) Date: Dec. 27, 2011

(87) PCT Pub. No.: WO2013/078731
PCT Pub. Date: Jun. 6, 2013

(65) Prior Publication Data
US 2013/0135553 A1    May 30, 2013

(30) Foreign Application Priority Data
Nov. 29, 2011 (CN) ................ 2011 1 0387590

(51) Int. Cl.
*G02F 1/1333* (2006.01)
(52) U.S. Cl.
USPC ................................................. 349/58
(58) Field of Classification Search
USPC ................................................. 349/58
See application file for complete search history.

(56) References Cited

U.S. PATENT DOCUMENTS

| 8,587,744 B2* | 11/2013 | Shin et al. ............ 349/58 |
| 2007/0126947 A1 | 6/2007 | Yu |
| 2007/0216825 A1* | 9/2007 | Hsu et al. ............ 349/58 |
| 2009/0180050 A1 | 7/2009 | Lee et al. |
| 2011/0149196 A1* | 6/2011 | Tanaka ............... 349/58 |

FOREIGN PATENT DOCUMENTS

| CN | 1811562 A | 8/2006 |
| CN | 2886996 Y | 4/2007 |
| CN | 101295087 A | 10/2008 |
| CN | 102067018 A | 5/2011 |
| CN | 102096218 A | 6/2011 |
| JP | 2008-76918 A | 4/2008 |

* cited by examiner

*Primary Examiner* — Wen-Ying P Chen
(74) *Attorney, Agent, or Firm* — Cheng-Ju Chiang

(57) ABSTRACT

A liquid crystal display (LCD) device and a fixing structure thereof are disclosed. The LCD device comprises a backlight unit and an LCD panel. The backlight unit is fixed through a first frame disposed at a side edge thereof, and the LCD panel is fixed through a second frame disposed at side edges thereof. The first frame is provided with a snap-fitting groove mechanism, and the second frame is provided with a snap-fitting mechanism for mating with the snap-fitting groove mechanism to fix the LCD panel. Because the second frame is joined with the first frame through snap-fitting in the LCD device and the fixing structure thereof of the present disclosure, it is unnecessary to use screws for fixing purpose. This makes the assembling process simple, efficient and time-saving, so the production efficiency of the LCD device is increased and the production cost is reduced.

11 Claims, 3 Drawing Sheets

LCD DEVICE AND FIXING STRUCTURE THEREOF

FIELD OF THE INVENTION

The present disclosure generally relates to the field of displaying technologies, and more particularly, to a liquid crystal display (LCD) device and a fixing structure thereof.

BACKGROUND OF THE INVENTION

As the display technologies become increasingly sophisticated and displays are more and more widely used, producing the displays quickly in large batches has become an important means for manufacturers to gain the competitive edge.

In the prior art, an LCD device mainly comprises an LCD panel and a backlight unit, and the backlight unit further comprises a light guide plate, a reflective sheet, a light bar, a back frame and so on.

The LCD panel must be protected and fixed by a front frame. For a large-size LCD panel, the front frame and the backlight unit are generally fixed together by means of screws to fix the LCD panel. For example, in existing large-size LCD panels, the front frame is fixed by screws at a front side or a lateral side thereof; and in LCD panels of the narrow-frame design, the front frame is generally fixed by means of screws at lateral sides thereof. This makes the operations complex, inefficient and time-consuming, and as the labor cost increases, also leads to an increase of the overall product cost.

Accordingly, the conventional practice of fixing the front frame and the backlight unit together by means of screws is complex, inefficient and time-consuming and degrades the production efficiency of the LCD device.

Moreover, the conventional frame for fixing the LCD panel is of an integrally formed structure, which makes both fabrication of corresponding moulds and transportation relatively complex.

SUMMARY OF THE INVENTION

An objective of the present disclosure is to provide an LCD device and a fixing structure thereof, which can solve the problems with the prior art that fixing the front frame and the backlight unit together by means of screws is complex, inefficient and time-consuming and degrades the production efficiency of the LCD device and that fabrication of corresponding moulds and transportation are relatively complex.

To achieve the aforesaid objective, the present disclosure provides an LCD device, which comprises an LCD panel, a backlight unit, a first frame and a second frame; wherein:

the backlight unit is adapted to provide backlight for the LCD panel;

the first frame disposed at a side edge of the backlight unit is adapted to accommodate and fix the backlight unit; and the second frame is in the form of four pieces disposed at four side edges of the LCD panel respectively, and comprises a pressing plate for pressing an edge of the LCD panel and a side plate for mating with the first frame;

wherein the first frame is provided with a snap-fitting groove mechanism having a first end and a second end, the first end has a first assembling dimension and the second end has a second assembling dimension, the snap-fitting groove mechanism further comprises a protrusion disposed at the second end of the snap-fitting groove mechanism, and the protrusion protrudes towards the backlight unit so that a snap-fitting mechanism that moves to the second end is snap-fitted to the first frame at the protrusion;

wherein the side plate of the second frame is provided with the snap-fitting mechanism for mating with the snap-fitting groove mechanism, the snap-fitting mechanism comprises a main stem portion and a snap-fitting portion disposed at an end of the main stem portion, the main stem portion has a third assembling dimension, and the snap-fitting portion has a fourth assembling dimension; and wherein the first assembling dimension is greater than the fourth assembling dimension, which is greater than the second assembling dimension, which is further greater than the third assembling dimension, and the snap-fitting mechanism enters the snap-fitting groove mechanism through the first end and moves to the second end so that the main stem portion extends through the first frame and the snap-fitting portion is snap-fitted with the first frame to fix the LCD panel.

According to a preferred embodiment of the present disclosure, the snap-fitting mechanism is integrally formed on the second frame.

According to a preferred embodiment of the present disclosure, the snap-fitting mechanism is riveted, inlaid, soldered or threaded to the second frame.

According to a preferred embodiment of the present disclosure, the second frame has an L-shaped, U-shaped or ⊏-shaped cross section.

To achieve the aforesaid objective, the present disclosure further provides an LCD device, which comprises an LCD panel, a backlight unit, a first frame and a second frame; wherein:

the backlight unit is adapted to provide backlight for the LCD panel;

the first frame disposed at a side edge of the backlight unit is adapted to accommodate and fix the backlight unit; and the second frame comprises a pressing plate for pressing an edge of the LCD panel and a side plate for mating with the first frame;

wherein the first frame is provided with a snap-fitting groove mechanism having a first end and a second end, the first end has a first assembling dimension, and the second end has a second assembling dimension;

wherein the side plate of the second frame is provided with a snap-fitting mechanism for mating with the snap-fitting groove mechanism, the snap-fitting mechanism comprises a main stem portion and a snap-fitting portion disposed at an end of the main stem portion, the main stem portion has a third assembling dimension, and the snap-fitting portion has a fourth assembling dimension; and wherein the first assembling dimension is greater than the fourth assembling dimension, which is greater than the second assembling dimension, which is further greater than the third assembling dimension, and the snap-fitting mechanism enters the snap-fitting groove mechanism through the first end and moves to the second end so that the main stem portion extends through the first frame and the snap-fitting portion is snap-fitted with the first frame to fix the LCD panel.

According to a preferred embodiment of the present disclosure, the snap-fitting groove mechanism further comprises a protrusion disposed at the second end of the snap-fitting groove mechanism, and the protrusion protrudes towards the backlight unit so that the snap-fitting mechanism that moves to the second end is snap-fitted to the first frame at the protrusion.

According to a preferred embodiment of the present disclosure, the second frame is in the form of four pieces disposed at four side edges of the LCD panel respectively.

To achieve the aforesaid objective, the present disclosure further provides a fixing structure for fixing an LCD panel and a backlight unit of an LCD device, which comprises a first frame and a second frame; wherein:

the first frame disposed at a side edge of the backlight unit is adapted to accommodate and fix the backlight unit; and the second frame comprises a pressing plate for pressing an edge of the LCD panel and a side plate for mating with the first frame;

wherein the first frame is provided with a snap-fitting groove mechanism having a first end and a second end, the first end has a first assembling dimension, and the second end has a second assembling dimension;

wherein the side plate of the second frame is provided with a snap-fitting mechanism for mating with the snap-fitting groove mechanism, the snap-fitting mechanism comprises a main stem portion and a snap-fitting portion disposed at an end of the main stem portion, the main stem portion has a third assembling dimension, and the snap-fitting portion has a fourth assembling dimension; and wherein the first assembling dimension is greater than the fourth assembling dimension, which is greater than the second assembling dimension, which is further greater than the third assembling dimension, and the snap-fitting mechanism enters the snap-fitting groove mechanism through the first end and moves to the second end so that the main stem portion extends through the first frame and the snap-fitting portion is snap-fitted with the first frame to fix the LCD panel.

According to a preferred embodiment of the present disclosure, the snap-fitting mechanism is a rivet disposed on the second frame.

The present disclosure has the following benefits as compared to the prior art: because the second frame is joined with the first frame through snap-fitting in the LCD device of the present disclosure, it is unnecessary to use screws for fixing purpose. This makes the assembling process simple, efficient and time-saving, so the production efficiency of the LCD device is increased and the production cost is reduced. Furthermore, this makes it convenient to process and transport the LCD device, which further reduces the cost.

BRIEF DESCRIPTION OF THE DRAWINGS

In order to more clearly describe the technical solutions of the embodiments of the present disclosure, attached drawings to be used in the detailed description of the disclosure will be briefly described hereinbelow. Obviously, the attached drawings described hereinbelow only illustrate some of the embodiments of the present disclosure, and those of ordinary skill in the art can also obtain other attached drawings therefrom without the need of making inventive efforts, wherein.

DETAILED DESCRIPTION OF THE INVENTION

Figure 1:
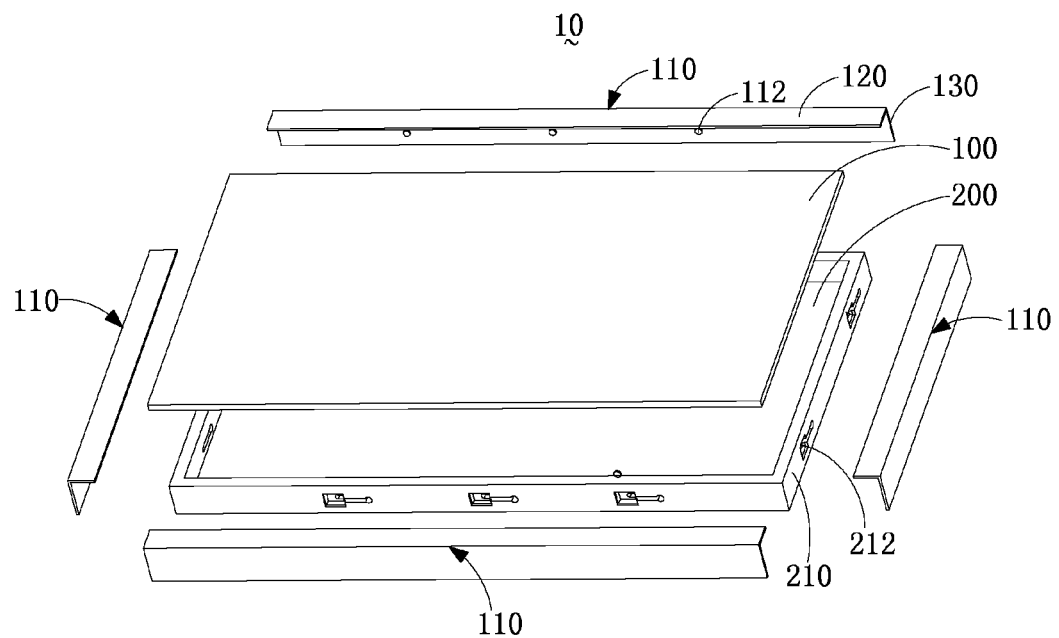
FIG. 1 is a simplified schematic view illustrating a structure of an LCD device according to a preferred embodiment of the present disclosure.

Various embodiments of the disclosure are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

Hereinbelow, the technical solutions of embodiments of the present disclosure will be described clearly and completely with reference to the attached drawings. Obviously, the embodiments described herein are only some of the embodiments of the present disclosure but do not represent all embodiments of the disclosure. All other embodiments that can be devised by those of ordinary skill in the art on the basis of the embodiments described herein and without making inventive efforts shall fall within the scope of the present disclosure.

Referring to FIG. 1, there is shown a simplified schematic view illustrating a structure of an LCD device according to a preferred embodiment of the present disclosure. As shown in FIG. 1, the embodiment of the present disclosure provides an LCD device 10, which comprises an LCD panel 100, a backlight unit 200, a first frame 210 and a second frame 110. The LCD panel 100 is adapted to display an image. The backlight unit 200 is adapted to provide backlight for the LCD panel 100. The first frame 210 is adapted to accommodate and fix the backlight unit 200. The second frame 110 cooperates with the first frame 210 to accommodate and hold the LCD panel 100. The second frame 110 is disposed to at least a pair of opposite side edges of the LCD panel 100; e.g., the second frame 110 is disposed at an upper side edge and a lower side edge of the LCD panel 100 or at a left side edge and a right side edge of the LCD panel 100. Preferably, the second frame 110 is in the form of four pieces disposed at the upper side edge, the lower side edge, the left side edge and the right side edge of the LCD panel 100 respectively. The second frame 110 disposed piece by piece makes corresponding moulds simple and makes the transportation convenient.

Figure 2:
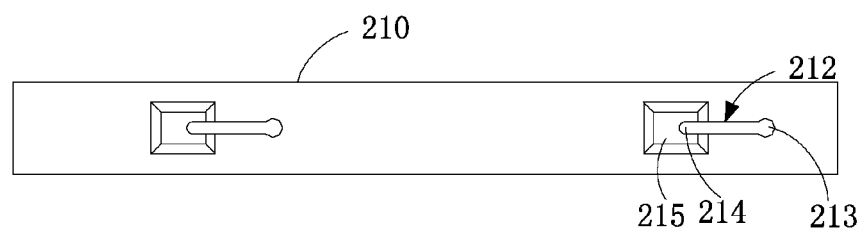
FIG. 2 is a schematic partial enlarged view illustrating a structure of a first frame of the LCD device shown in FIG. 1.

Referring to FIG. 2 together, there is shown a schematic enlarged view illustrating a structure of the first frame of the LCD device shown in FIG. 1. As shown in FIG. 2, the first frame 210 is provided with a snap-fitting groove mechanism 212. The snap-fitting groove mechanism 212 may be formed through a one-shot stamping molding process by means of a mould. The snap-fitting groove mechanism 212 comprises a first end 213 and a second end 214. The first end 213 has a first assembling dimension D1, the second end 214 has a second assembling dimension D2, and D1>D2.

In this embodiment of the present disclosure, the snap-fitting groove mechanism 212 is a through groove having a uniform groove width. The first end 213 is formed with a through hole, which has a diameter larger than the groove width of the through groove. In other embodiments, the through groove may also be designed with a groove width gradually decreasing from the first end 213 to the second end 214 so that D1>D2.

Figure 3:
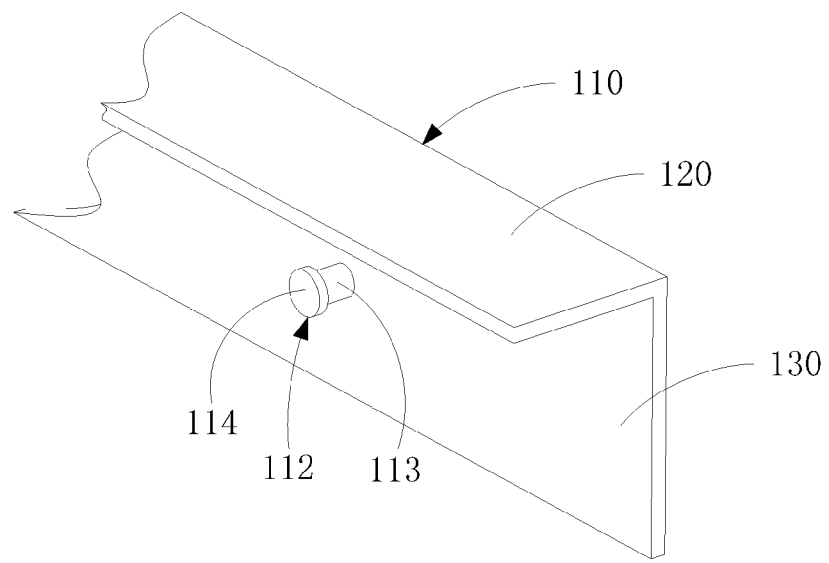
FIG. 3 is a schematic partial enlarged view illustrating a structure of a second frame of the LCD device shown in FIG. 1.

Referring to FIG. 3 together, there is shown a schematic enlarged view illustrating a structure of the second frame of the LCD device shown in FIG. 1. As shown in FIG. 3, the second frame 110 has an L-shaped cross section; and of course, the second frame 110 may also have a U-shaped or ⊏-shaped cross section.

The second frame 110 comprises a pressing plate 120 for pressing an edge of the LCD panel 100 and a side plate 130 for mating with the first frame 210. The side plate 130 of the second frame 110 is provided with a snap-fitting mechanism 112 for mating with the snap-fitting groove mechanism 212. The snap-fitting mechanism 112 comprises a main stem portion 113 and a snap-fitting portion 114 disposed at an end of the main stem portion 113. The main stem portion 113 has a third assembling dimension D3, the snap-fitting portion 114 has a fourth assembling dimension D4, and D4>D3. Moreover, the third assembling dimension D3 and the fourth assembling dimension D4 match with the first assembling dimension D1 of the first end 213 and the second assembling dimension D2 of the second end 214 of the snap-fitting groove mechanism 212; and more preferably, D1>D4>D2>D3.

In this embodiment of the present disclosure, the main stem portion 113 is of a cylindrical shape and has a certain length; and the snap-fitting portion 114 is in the form of a round disk and has a diameter greater than a diameter of the main stem portion 113.

During the assembling process, the snap-fitting mechanism 112 enters the snap-fitting groove mechanism 212 through the first end 213 and moves to the second end 214 so that the main stem portion 113 extends through the first frame 210 and the snap-fitting portion 114 is snap-fitted with the first frame 210 to fix the LCD panel 100.

Figure 4:
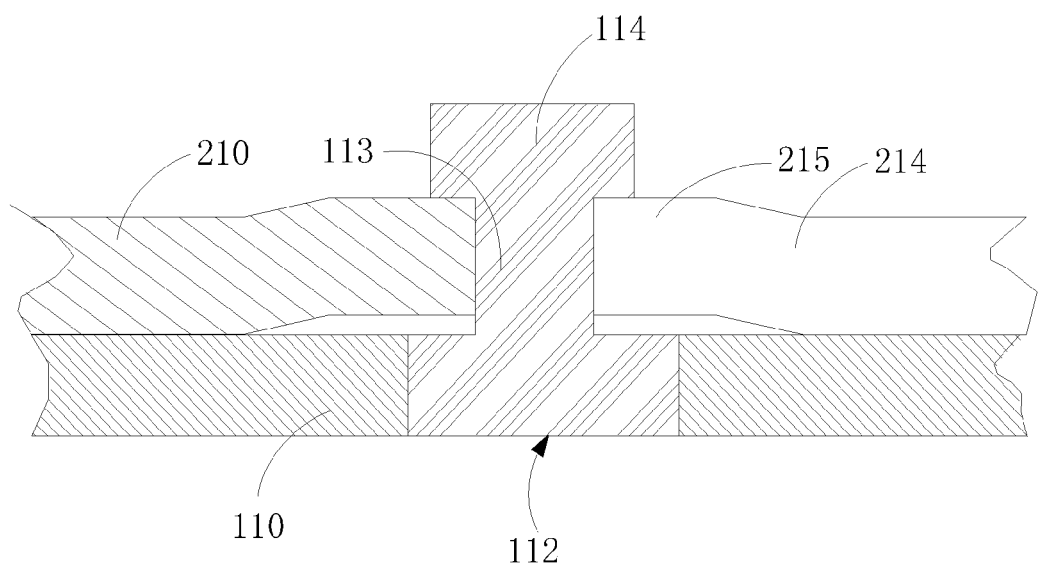
FIG. 4 is a schematic cross-sectional view illustrating a structure of the first frame and the second frame shown in FIG. 2 and FIG. 3 after being joined with each other.
Figure 5:
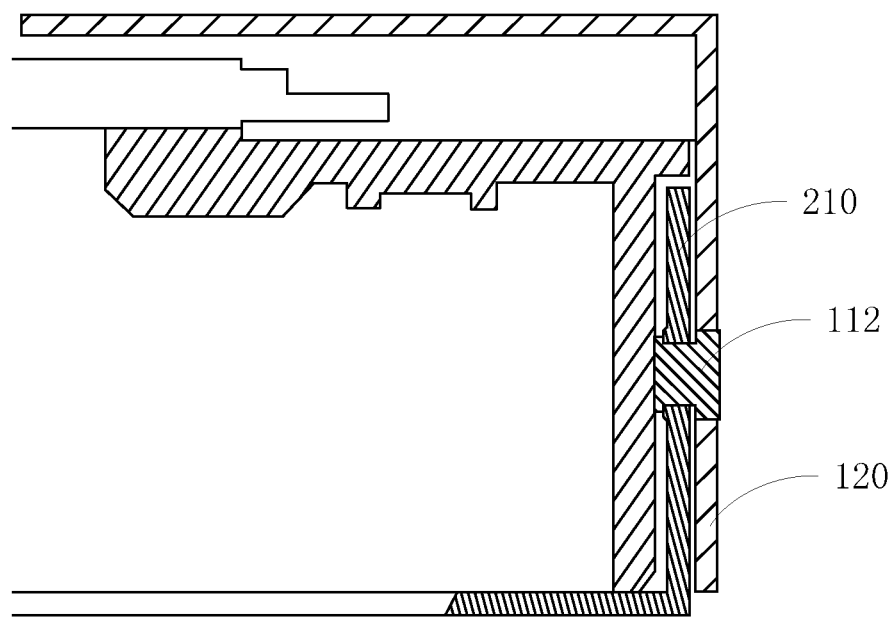
FIG. 5 is a schematic partial cross-sectional view of an LCD device according to a preferred embodiment of the present disclosure.

Referring to FIG. 4 and FIG. 5 together, FIG. 4 is a schematic cross-sectional view illustrating a structure of the first frame and the second frame shown in FIG. 2 and FIG. 3 after being joined with each other; and FIG. 5 is a schematic partial cross-sectional view of an LCD device according to a preferred embodiment of the present disclosure. In this preferred embodiment, the snap-fitting groove mechanism 212 further comprises a protrusion 215 (see FIG. 2) disposed at the second end 214 of the snap-fitting groove mechanism 212, and the protrusion 215 protrudes towards the backlight unit 200. Here, a peripheral side wall of the second end 214 has a height slightly greater than that of other positions of the snap-fitting groove mechanism 212 where the protrusion 215 is not disposed so that the snap-fitting mechanism 112 that moves to the second end 214 is snap-fitted to the first frame 210 at the protrusion 215.

In this embodiment of the present disclosure, the snap-fitting mechanism 112 may be integrally formed on the second frame 110, or may be riveted, inlaid, soldered or threaded to the second frame 110. In practice, the snap-fitting mechanism 112 may be a rivet disposed on the second frame 110.

The assembling process is accomplished in the following steps.

Firstly, an operator places the second frame 110 near the first frame 210 with the snap-fitting portion 114 being aligned with the first end 213 for inserting purpose.

Then, the second frame 110 is pushed towards the second end 214.

Finally, the second frame 110 is stopped by the protrusion 215. At this point, the snap-fitting portion 114 is flexibly snap-fitted to the first frame 210 at the location of the protrusion 215, thereby fixing the LCD panel 100.

According to the above descriptions, it shall be readily appreciated by people skilled in the art that, because the second frame 110 is joined with the first frame 210 through snap-fitting in the LCD device 10 of the present disclosure, it is unnecessary to use screws for fixing purpose. This makes the assembling process simple, efficient and time-saving, so the production efficiency of the LCD device is increased and the production cost is reduced. Furthermore, this makes it convenient to process and transport the LCD device, which further reduces the cost.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A liquid crystal display (LCD) device, comprising:
an LCD panel;
a backlight unit, being adapted to provide backlight for the LCD panel;
a first frame disposed at a side edge of the backlight unit, being adapted to accommodate and fix the backlight unit; and
a second frame in the form of four pieces disposed at four side edges of the LCD panel respectively, the second frame comprising a pressing plate for pressing an edge of the LCD panel and a side plate for mating with the first frame,
wherein the first frame is provided with a snap-fitting groove mechanism having a first end and a second end, the first end has a first assembling dimension and the second end has a second assembling dimension, the snap-fitting groove mechanism further comprises a protrusion disposed at the second end of the snap-fitting groove mechanism, and the protrusion protrudes towards the backlight unit so that a snap-fitting mechanism that moves to the second end is snap-fitted to the first frame at the protrusion;
wherein the side plate of the second frame is provided with the snap-fitting mechanism for mating with the snap-fitting groove mechanism, the snap-fitting mechanism comprises a main stem portion and a snap-fitting portion disposed at an end of the main stem portion, the main stem portion has a third assembling dimension, and the snap-fitting portion has a fourth assembling dimension; and
wherein the first assembling dimension is greater than the fourth assembling dimension, which is greater than the second assembling dimension, which is further greater than the third assembling dimension, and the snap-fitting mechanism enters the snap-fitting groove mechanism through the first end and moves to the second end so that the main stem portion extends through the first frame and the snap-fitting portion is snap-fitted with the first frame to fix the LCD panel; the snap-fitting mechanism is riveted, inlaid, soldered or threaded to the second frame.

2. The LCD device of claim 1, wherein the second frame has an L-shaped, U-shaped or -shaped cross section.

3. An LCD (liquid crystal display) device, comprising:
an LCD panel;
a backlight unit, being adapted to provide backlight for the LCD panel;
a first frame disposed at a side edge of the backlight unit, being adapted to accommodate and fix the backlight unit; and
a second frame, comprising a pressing plate for pressing an edge of the LCD panel and a side plate for mating with the first frame,
wherein the first frame is provided with a snap-fitting groove mechanism having a first end and a second end, the first end has a first assembling dimension, and the second end has a second assembling dimension;
wherein the side plate of the second frame is provided with a snap-fitting mechanism for mating with the snap-fitting groove mechanism, the snap-fitting mechanism comprises a main stem portion and a snap-fitting portion disposed at an end of the main stem portion, the main stem portion has a third assembling dimension, and the snap-fitting portion has a fourth assembling dimension; and wherein the first assembling dimension is greater than the fourth assembling dimension, which is greater than the second assembling dimension, which is further greater than the third assembling dimension, and the snap-fitting mechanism enters the snap-fitting groove mechanism through the first end and moves to the second end so that the main stem portion extends through the first frame and the snap-fitting portion is snap-fitted with the first frame to fix the LCD panel; the snap-fitting mechanism is riveted, inlaid, soldered or threaded to the second frame.

4. The LCD device of claim 3, wherein the snap-fitting groove mechanism further comprises a protrusion disposed at the second end of the snap-fitting groove mechanism, and the protrusion protrudes towards the backlight unit so that the snap-fitting mechanism that moves to the second end is snap-fitted to the first frame at the protrusion.

5. The LCD device of claim 3, wherein the second frame is in the form of four pieces disposed at four side edges of the LCD panel respectively.

6. The LCD device of claim 5, wherein the second frame has an L-shaped, U-shaped or -shaped cross section.

7. A fixing structure for fixing an LCD (liquid crystal display) panel and a backlight unit of an LCD device, comprising:
 a first frame disposed at a side edge of the backlight unit, being adapted to accommodate and fix the backlight unit; and
 a second frame, comprising a pressing plate for pressing an edge of the LCD panel and a side plate for mating with the first frame, wherein the first frame is provided with a snap-fitting groove mechanism having a first end and a second end, the first end has a first assembling dimension, and the second end has a second assembling dimension;

wherein the side plate of the second frame is provided with a snap-fitting mechanism for mating with the snap-fitting groove mechanism, the snap-fitting mechanism comprises a main stem portion and a snap-fitting portion disposed at an end of the main stem portion, the main stem portion has a third assembling dimension, and the snap-fitting portion has a fourth assembling dimension; and wherein the first assembling dimension is greater than the fourth assembling dimension, which is greater than the second assembling dimension, which is further greater than the third assembling dimension, and the snap-fitting mechanism enters the snap-fitting groove mechanism through the first end and moves to the second end so that the main stem portion extends through the first frame and the snap-fitting portion is snap-fitted with the first frame to fix the LCD panel; the snap-fitting mechanism is riveted, inlaid, soldered or threaded to the second frame.

8. The fixing structure of claim 7, wherein the snap-fitting groove mechanism further comprises a protrusion disposed at the second end of the snap-fitting groove mechanism, and the protrusion protrudes towards the backlight unit so that the snap-fitting mechanism that moves to the second end is snap-fitted to the first frame at the protrusion.

9. The fixing structure of claim 7, wherein the second frame is in the form of four pieces disposed at four side edges of the LCD panel respectively.

10. The fixing structure of claim 9, wherein the second frame has an L-shaped, U-shaped or -shaped cross section.

11. The fixing structure of claim 7, wherein the snap-fitting mechanism is a rivet disposed on the second frame.

\* \* \* \* \*